United States Patent [19] [11] Patent Number: 5,933,787
Gilhousen et al. [45] Date of Patent: *Aug. 3, 1999

[54] METHOD AND APPARATUS FOR PERFORMING HANDOFF BETWEEN SECTORS OF A COMMON BASE STATION

[75] Inventors: Klein S. Gilhousen, Bozeman, Mont.; Roberto Padovani, San Diego, Calif.; Lindsay A. Weaver, Jr., Boulder, Colo.

[73] Assignee: Qualcomm Incorporated, San Diego, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/763,498

[22] Filed: Dec. 11, 1996

Related U.S. Application Data

[62] Division of application No. 08/405,611, Mar. 13, 1995, Pat. No. 5,625,876.

[51] Int. Cl.⁶ ........................................ H04Q 7/30
[52] U.S. Cl. .......................... 455/562; 455/101; 455/132; 455/277.1; 455/442; 375/347
[58] Field of Search .................... 455/33.3, 33.1, 455/33.2, 33.4, 56.1, 101–105, 132–135, 137, 140, 69, 70, 438, 439, 442, 444, 447, 277.1, 272, 273, 277.2; 379/59, 60; 375/347, 349

[56] References Cited

U.S. PATENT DOCUMENTS

| 3,819,872 | 6/1974 | Hamrick ................................ 179/41 A |
| 4,004,224 | 1/1977 | Aren et al. .................................. 325/2 |
| 4,112,257 | 9/1978 | Frost .................................... 179/2 EB |
| 4,123,718 | 10/1978 | Lampert et al. ......................... 325/474 |
| 4,211,894 | 7/1980 | Watanabe et al. .......................... 179/2 |
| 4,222,115 | 9/1980 | Cooper et al. .............................. 375/1 |
| 4,309,771 | 1/1982 | Wilkens ..................................... 375/58 |
| 4,369,520 | 1/1983 | Cerny, Jr. et al. ....................... 455/137 |
| 4,398,063 | 8/1983 | Hass et al. ............................. 179/2 EB |
| 4,475,010 | 10/1984 | Huensch et al. .................... 179/2 REB |
| 4,495,648 | 1/1985 | Geiger ........................................ 455/73 |
| 4,580,262 | 4/1986 | Naylor et al. ................................ 371/5 |
| 4,596,042 | 6/1986 | Stangl ........................................ 455/56 |
| 4,608,711 | 8/1986 | Goldman ..................................... 455/33 |
| 4,639,914 | 1/1987 | Winters . |
| 4,641,322 | 2/1987 | Hasegawa .................................... 375/1 |
| 4,672,658 | 6/1987 | Kavehrad et al. ......................... 379/63 |
| 4,697,260 | 9/1987 | Grauel et al. .............................. 379/60 |
| 4,718,081 | 1/1988 | Brenig ........................................ 379/60 |
| 4,723,266 | 2/1988 | Perry ......................................... 379/60 |
| 4,730,310 | 3/1988 | Acampora et al. . |
| 4,737,978 | 4/1988 | Burke et al. ............................... 379/60 |

(List continued on next page.)

FOREIGN PATENT DOCUMENTS

| 0532485 | 3/1993 | European Pat. Off. .......... H04B 7/26 |
| 9107036 | 11/1909 | WIPO ............................ H04L 27/30 |
| 9006416 | 11/1990 | WIPO ............................. H04B 7/14 |
| 9217954 | 10/1992 | WIPO . |

OTHER PUBLICATIONS

"Handover with Simulcasting", *IEEE*, Per–Erik Ostling, Oct. 5, 1992, pp. 823–826.

*Primary Examiner*—Wellington Chin
*Assistant Examiner*—Lee Nguyen
*Attorney, Agent, or Firm*—Russell B. Miller; Bruce W. Greenhaus; Kent D. Baker

[57] ABSTRACT

A method and apparatus providing softer handoff of a mobile unit between sectors of a common base station. A sectorized base station comprises a set of demodulation elements. Each demodulation element may be assigned to a signal from one of a plurality of sectors. The output of the demodulators are combined before the decoding process independent of the sector from which the data originated. This configuration provides improved output data reliability, more stable power control, and more efficient use of resources at the base station.

3 Claims, 4 Drawing Sheets

U.S. PATENT DOCUMENTS

| | | | |
|---|---|---|---|
| 4,759,051 | 7/1988 | Han | 379/59 |
| 4,765,753 | 8/1988 | Schmidt | 379/60 |
| 4,771,448 | 9/1988 | Koohgli et al. | 379/60 |
| 4,811,421 | 3/1989 | Havel et al. | 455/69 |
| 4,955,082 | 9/1990 | Hattori et al. | 455/33 |
| 4,975,939 | 12/1990 | Sasaki | 379/610 |
| 5,054,110 | 10/1991 | Comroe et al. | 455/33 |
| 5,056,109 | 10/1991 | Gilhousen et al. | 375/1 |
| 5,101,501 | 3/1992 | Gilhousen et al. | 455/33 |
| 5,103,459 | 4/1992 | Gilhousen et al. | 375/1 |
| 5,109,390 | 4/1992 | Gilhousen et al. | 375/1 |
| 5,109,528 | 4/1994 | Uddenfeldt | 455/33.2 |
| 5,127,100 | 6/1992 | D'Amico et al. | 455/33.1 |
| 5,134,715 | 7/1992 | Parl et al. | 455/64 |
| 5,164,958 | 11/1992 | Omura | 375/1 |
| 5,175,878 | 12/1992 | Davis et al. | 455/103 |
| 5,179,571 | 1/1993 | Schilling | 375/1 |
| 5,243,598 | 9/1993 | Lee | 370/95.3 |
| 5,265,119 | 11/1993 | Gillhousen et al. | 375/1 |
| 5,267,261 | 11/1993 | Blakeney, II et al. | 375/1 |
| 5,301,352 | 4/1994 | Nakagawa et al. | 455/3.2 |
| 5,309,474 | 5/1994 | Gilhousen et al. | 375/1 |
| 5,327,577 | 7/1994 | Uddenfeldt | 455/33.2 |
| 5,345,467 | 9/1994 | Lomp et al. | 375/1 |
| 5,345,499 | 9/1994 | Benveniste | 379/59 |
| 5,369,663 | 11/1994 | Bond | 375/1 |
| 5,490,165 | 2/1996 | Blakenley, II et al. | 375/205 |
| 5,491,717 | 2/1996 | Hall | 370/332 |
| 5,625,876 | 4/1997 | Gilhousen et al. | | ns pages# METHOD AND APPARATUS FOR PERFORMING HANDOFF BETWEEN SECTORS OF A COMMON BASE STATION This is a divisional of application Ser. No. 08/405,611 filed Mar. 13, 1995, U.S. Pat. No. 5,625,876.

BACKGROUND OF THE INVENTION

I. Field of the Invention

The present invention relates to communication systems, particularly to a method and apparatus for performing handoff between two sectors of a common base station.

II. Description of the Related Art

In a code division multiple access (CDMA) cellular telephone system or personal communications system, a common frequency band is used for communication with all base stations in a system. The common frequency band allows simultaneous communication between a mobile unit and more than one base station. Signals occupying the common frequency band are discriminated at the receiving station through the spread spectrum CDMA waveform properties based on the use of a high speed pseudonoise (PN) code. The high speed PN code is used to modulate signals transmitted from the base stations and the mobile units. Transmitter stations using different PN codes or PN codes that are offset in time produce signals that can be separately received at the receiving station. The high speed PN modulation also allows the receiving station to receive a signal from a single transmitting station where the signal has traveled over several distinct propagation paths.

A signal having traveled several distinct propagation paths generates the multipath characteristics of the radio channel. One characteristic of a multipath channel is the time spread introduced in a signal that is transmitted through the channel. For example, if an ideal impulse is transmitted over a multipath channel, the received signal appears as a stream of pulses. Another characteristic of the multipath channel is that each path through the channel may cause a different attenuation factor. For example, if an ideal impulse is transmitted over a multipath channel, each pulse of the received stream of pulses generally has a different signal strength than other received pulses. Yet another characteristic of the multipath channel is that each path through the channel may cause a different phase on the signal. For example, if an ideal impulse is transmitted over a multipath channel, each pulse of the received stream of pulses generally has a different phase than other received pulses.

In the radio channel, the multipath is created by reflection of the signal from obstacles in the environment, such as buildings, trees, cars, and people. In general the radio channel is a time varying multipath channel due to the relative motion of the structures that create the multipath. For example, if an ideal impulse is transmitted over the time varying multipath channel, the received stream of pulses would change in time location, attenuation, and phase as a function of the time that the ideal impulse was transmit.

The multipath characteristic of a channel can result in signal fading. Fading is the result of the phasing characteristics of the multipath channel. A fade occurs when multipath vectors added destructively, yielding a received signal that is smaller than either individual vector. For example if a sine wave is transmitted through a multipath channel having two paths where the first path has an attenuation factor of X dB, a time delay of $\delta$ with a phase shift of $\Theta$ radians, and the second path has an attenuation factor of X dB, a time delay of $\delta$ with a phase shift of $\Theta+\pi$ radians, no signal would be received at the output of the channel.

In narrow band modulation systems such as the analog FM modulation employed by conventional radio telephone systems, the existence of multiple path in the radio channel results in severe multipath fading. As noted above with a wideband CDMA, however, the different paths may be discriminated in the demodulation process. This discrimination not only greatly reduces the severity of multipath fading but provides an advantage to the CDMA system.

In an exemplary CDMA system, each base station transmits a pilot signal having a common PN spreading code that is offset in code phase from the pilot signal of other base stations. During system operation, the mobile unit is provided with a list of code phase offsets corresponding to neighboring base stations surrounding the base station through which communication is established. The mobile unit is equipped with a searching element that allows the mobile unit to track the signal strength of the pilot signal from a group of base stations including the neighboring base stations.

A method and system for providing a communication with the mobile unit through more than one base station during the handoff process are disclosed in U.S. patent application Ser. No. 07/847,148, filed Mar. 5, 1992, entitled "MOBILE ASSISTED SOFT HANDOFF IN A CDMA CELLULAR TELEPHONE SYSTEM," assigned to the assignee of the present invention. Using this system, communication between the mobile unit and the end user is uninterrupted by the eventual handoff from an original base station to a subsequent base station. This type of handoff may be considered as a "soft" handoff in that communication with the subsequent base station is established before communication with the original base station is terminated. When the mobile unit is in communication with two base stations, a single signal for the end user is created from the signals from each base station by a cellular or personal communication system controller.

Mobile unit assisted soft handoff operates based on the pilot signal strength of several sets of base stations as measured by the mobile unit. The Active Set is the set of base stations through which active communication is established. The Neighbor Set is a set of base stations surrounding an active base station comprising base stations that have a high probability of having a pilot signal strength of sufficient level to establish communication. The Candidate Set is a set of base stations having a pilot signal strength of sufficient level to establish communication.

When communications are initially established, a mobile unit communicates through a first base station and the Active Set contains only the first base station. The mobile unit monitors the pilot signal strength of the base stations of the Active Set, the Candidate Set, and the Neighbor Set. When a pilot signal of a base station in the Neighbor Set exceeds a predetermined threshold level, the base station is added to the Candidate Set and removed from the Neighbor Set at the mobile unit. The mobile unit communicates a message to the first base station identifying the new base station. A cellular or personal communication system controller decides whether to establish communication between the new base station and the mobile unit. Should the cellular or personal communication system controller decide to do so, the cellular or personal communication system controller sends a message to the new base station with identifying information about the mobile unit and a command to establish communications therewith. A message is also transmitted to the mobile unit through the first base station. The message identifies a new Active Set that includes the first and the new base stations. The mobile unit searches for the new base station transmitted information signal and communication is established with the new base station without termination of communication through the first base station. This process can continue with additional base stations.

When the mobile unit is communicating through multiple base stations, it continues to monitor the signal strength of the base stations of the Active Set, the Candidate Set, and the Neighbor Set. Should the signal strength corresponding to a base station of the Active Set drop below a predetermined threshold for a predetermined period of time, the mobile unit generates and transmits a message to report the event. The cellular or personal communication system controller receives this message through at least one of the base stations with which the mobile unit is communicating. The cellular or personal communication system controller may decide to terminate communications through the base station having a weak pilot signal strength.

The cellular or personal communication system controller upon deciding to terminate communications through a base station generates a message identifying a new Active Set of base stations. The new Active Set does not contain the base station through which communication is to be terminated. The base stations through which communication is established send a message to the mobile unit. The cellular or personal communication system controller also communicates information to the base station to terminate communications with the mobile unit. The mobile unit communications are thus routed only through base stations identified in the new Active Set.

Because the mobile unit is communicating with the end user though at least one base station at all times throughout the soft handoff processes, no interruption in communications occurs between the mobile unit and the end user. A soft handoff provides significant benefits in its inherent "make before break" communication over conventional "break before make" techniques employed in other cellular communication systems.

In a cellular or personal communication telephone system, maximizing the capacity of the system in terms of the number of simultaneous telephone calls that can be handled is extremely important. System capacity in a spread spectrum system can be maximized if the transmitter power of each mobile unit is controlled such that each transmitted signal arrives at the base station receiver at the same level. In an actual system, each mobile unit may transmit the minimum signal level that produces a signal-to-noise ratio that allows acceptable data recovery. If a signal transmitted by a mobile unit arrives at the base station receiver at a power level that is too low, the bit-error-rate may be too high to permit high quality communications due to interference from the other mobile units. On the other hand, if the mobile unit transmitted signal is at a power level that is too high when received at the base station, communication with this particular mobile unit is acceptable but this high power signal acts as interference to other mobile units. This interference may adversely affect communications with other mobile units.

Therefore to maximize capacity in an exemplary CDMA spread spectrum system, the transmit power of each mobile unit within the coverage area of a base station is controlled by the base station to produce the same nominal received signal power at the base station. In the ideal case, the total signal power received at the base station is equal to the nominal power received from each mobile unit multiplied by the number of mobile units transmitting within the coverage area of the base station plus the power received at the base station from mobile units in the coverage area of neighboring base stations.

The path loss in the radio channel can be characterized by two separate phenomena: average path loss and fading. The forward link, from the base station to the mobile unit, operates on a different frequency than the reverse link, from the mobile unit to the base station. However because the forward link and reverse link frequencies are within the same frequency band, a significant correlation between the average path loss of the two links exists. On the other hand, fading is an independent phenomenon for the forward link and reverse link and varies as a function of time.

In an exemplary CDMA system, each mobile unit estimates the path loss of the forward link based on the total power at the input to the mobile unit. The total power is the sum of the power from all base stations operating on the same frequency assignment as perceived by the mobile unit. From the estimate of the average forward link path loss, the mobile unit sets the transmit level of the reverse link signal. Should the reverse link channel for one mobile unit suddenly improve compared to the forward link channel for the same mobile unit due to independent fading of the two channels, the signal as received at the base station from this mobile unit would increase in power. This increase in power causes additional interference to all signals sharing the same frequency assignment. Thus a rapid response of the mobile unit transmit power to the sudden improvement in the channel would improve system performance.

Mobile unit transmit power is also controlled by one or more base stations. Each base station with which the mobile unit is in communication measures the received signal strength from the mobile unit. The measured signal strength is compared to a desired signal strength level for that particular mobile unit. A power adjustment command is generated by each base station and sent to the mobile unit on the forward link. In response to the base station power adjustment command, the mobile unit increases or decreases the mobile unit transmit power by a predetermined amount. By this method, a rapid response to a change in the channel is effected and the average system performance is improved.

When a mobile unit is in communication with more than one base station, power adjustment commands are provided from each base station. The mobile unit acts upon these multiple base station power adjustment commands to avoid transmit power levels that may adversely interfere with other mobile unit communications and yet provide sufficient power to support communication from the mobile unit to at least one of the base stations. This power control mechanism is accomplished by having the mobile unit increase its transmit signal level only if every base station with which the mobile unit is in communication requests an increase in power level. The mobile unit decreases its transmit signal level if any base station with which the mobile unit is in communication requests that the power be decreased. A system for base station and mobile unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the Assignee of the present invention.

Base station diversity at the mobile unit is an important consideration in the soft handoff process. The power control method described above operates optimally when the mobile unit communicates with each base station through which communication is possible. In doing so, the mobile unit avoids inadvertently interfering with communications through a base station receiving the mobile unit's signal at an excessive level but unable to communicate a power adjustment command to the mobile unit because communication is not established therewith.

A typical cellular or personal communication system contains some base stations having multiple sectors. A multi-sectored base station comprises multiple independent transmit and receive antennas. The present invention is a method and apparatus of handoff between sectors of a common base station. The present invention is called softer handoff.

It is therefore the object of the present invention to provide a method and apparatus for performing handoff between two sectors of a common base station.

It is another object of the present invention to provide a method and apparatus for performing softer handoff between two sectors of a common base station such that improved power control performance is provided.

It is yet another object of the present invention to provide a method and apparatus for performing softer handoff between two sectors of a common base station such that base station resources are used efficiently.

SUMMARY OF THE INVENTION

The present invention defines a method and apparatus for performing softer handoff between sectors of a common base station. The method and apparatus provide a set of demodulation elements in the base station. The demodulation elements, instead of being assigned to a single sector, may be assigned to a signal from any one of a set of sectors in the base station. Thus, the base station may use its resources with high efficiency by assigning demodulation elements to the strongest signals available.

The combination process in softer handoff allows demodulated data from different sectors to be combined before decoding and thus produce a single soft decision output value. The combination process can be performed based on the relative signal level of each signal thus providing the most reliable combination process.

Combining signals from sectors of a common base station also allows a sectorized base station to make a single power adjustment command for mobile unit power control. Thus the power adjustment command from each sector of a common base station is the same. This uniformity in power control allows flexible handoff operation in that sector diversity at the mobile unit is not critical to the power control process.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 1:
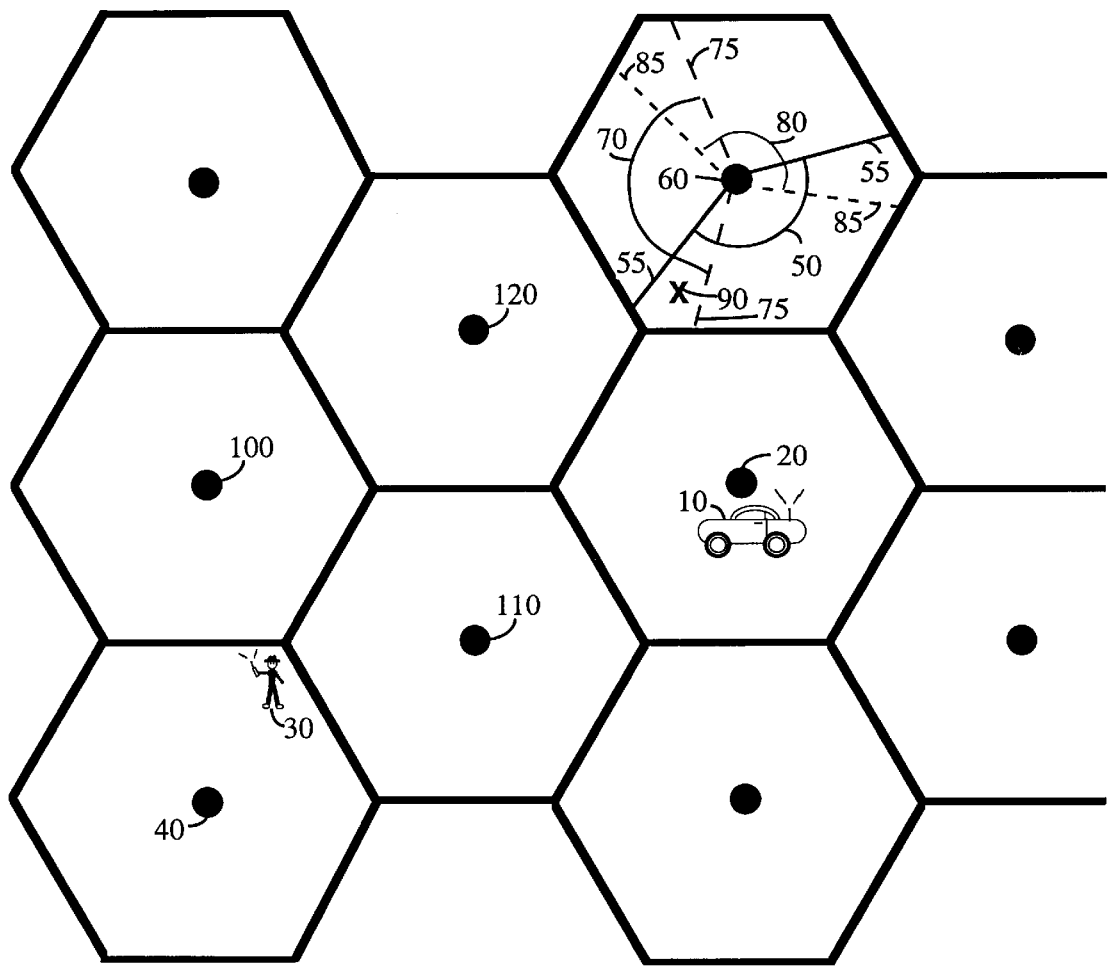
FIG. 1 is a diagram illustrating an exemplary base station coverage area structure.

FIG. 1 illustrates an exemplary base station coverage area structure. In such an exemplary structure, hexagonal base station coverage areas abut one another in a symmetrically tiled arrangement. Each mobile unit is located within the coverage area of one of the base stations. For example, mobile unit 10 is located within the coverage area of base station 20. In a code division multiple access (CDMA) cellular or personal communication telephone system, a common frequency band is used for communication with all base stations in a system allowing simultaneously communication between a mobile unit and more than one base station. Mobile unit 10 is located very close to base station 20 and therefore receives a large signal from base station 20 and relatively small signals from surrounding base stations. However mobile unit 30 is located in the coverage area of base station 40 but is close to the coverage area of base stations 100 and 110. Mobile unit 30 receives a relatively weak signal from base station 40 and similarly sized signals from base stations 100 and 110. Mobile unit 30 might be in soft handoff with base stations 40, 100, and 110.

The exemplary base station coverage area structure illustrated in FIG. 1 is highly idealized. In the actual cellular or personal communication environment, base station coverage areas may vary in size and in shape. Base station coverage areas may tend to overlap with coverage area boundaries defining coverage area shapes different from the ideal hexagon shape. Furthermore, base stations may also be sectored such as into three sectors, as is well known in the art. Base station 60 is shown as a three sectored base station. However base stations with lesser or greater numbers of sectors are envisioned.

Base station 60 of FIG. 1 represents an idealized three sectored base station. Base station 60 has three sectors, each of which covers more than 120 degrees of the base station coverage area. Sector 50, having a coverage area indicated by the unbroken lines 55, overlaps the coverage area of sector 70, having a coverage area indicated by the coarse dashed lines 75. Sector 50 also overlaps the sector 80, having a coverage area as indicated by the fine dashed lines 85. For example, location 90 as indicated by the X is located in both the coverage area of sector 50 and sector 70.

In general a base station is sectorized to reduce the total interference power to mobile units located within the coverage area of the base station while increasing the number of mobile units that can communicate through the base station. For example, sector 80 would not transmit a signal intended for a mobile unit at location 90 and thus no mobile unit located in sector 80 is significantly interfered with by the communication of a mobile unit at location 90 with base station 60.

For a mobile unit positioned at location 90, the total interference has contributions from sectors 50 and 70 and from base stations 20 and 120. A mobile unit a location 90 might be in softer handoff, as described below, with sectors 50 and 70. A mobile unit at location 90 may simultaneously be in soft handoff with base stations 20 and 120.

A method and system for providing communication with a mobile unit through more than one base station during the handoff process are disclosed in U.S. patent application Ser. No. 07/847,148 as described above. This type of handoff may be considered a "soft" handoff in that communication with the subsequent base station is established before communication with the original base station is terminated.

At a unsectorized base station, a set of multipath signals from a single mobile unit are separately demodulated and then combined before the decoding process. Therefore the decoded data output from each base station is based on all of the advantageous signal paths available from the mobile unit. The decoded data is sent to the cellular or personal communication system controller from each base station in the system.

For each mobile unit operating in soft handoff in the system, the cellular or personal communication system controller receives decoded data from at least two base stations. For example, in FIG. 1 the cellular or personal communications system controller would receive decoded data from mobile unit 30 from base stations 40, 100, and 110. Combining the decoded data does not yield the great advantage of combining the data prior to decoding. A typical cellular or personal communication system controller may choose not to combine the decoded data from each base station and instead select the decoded data from the base station having the highest signal quality index and discard the data from any other base station.

The method of soft handoff could be directly applied to a sectorized base station by treating each sector of a common base station as a separate, independent base station. Each sector of the base station could combine and decode multipath signals from a common mobile unit. The decoded data could be sent directly to the cellular or personal communication system controller by each sector of the base station or it could be compared and selected at the base station and the result sent to the cellular or personal communication system controller.

Figure 2:
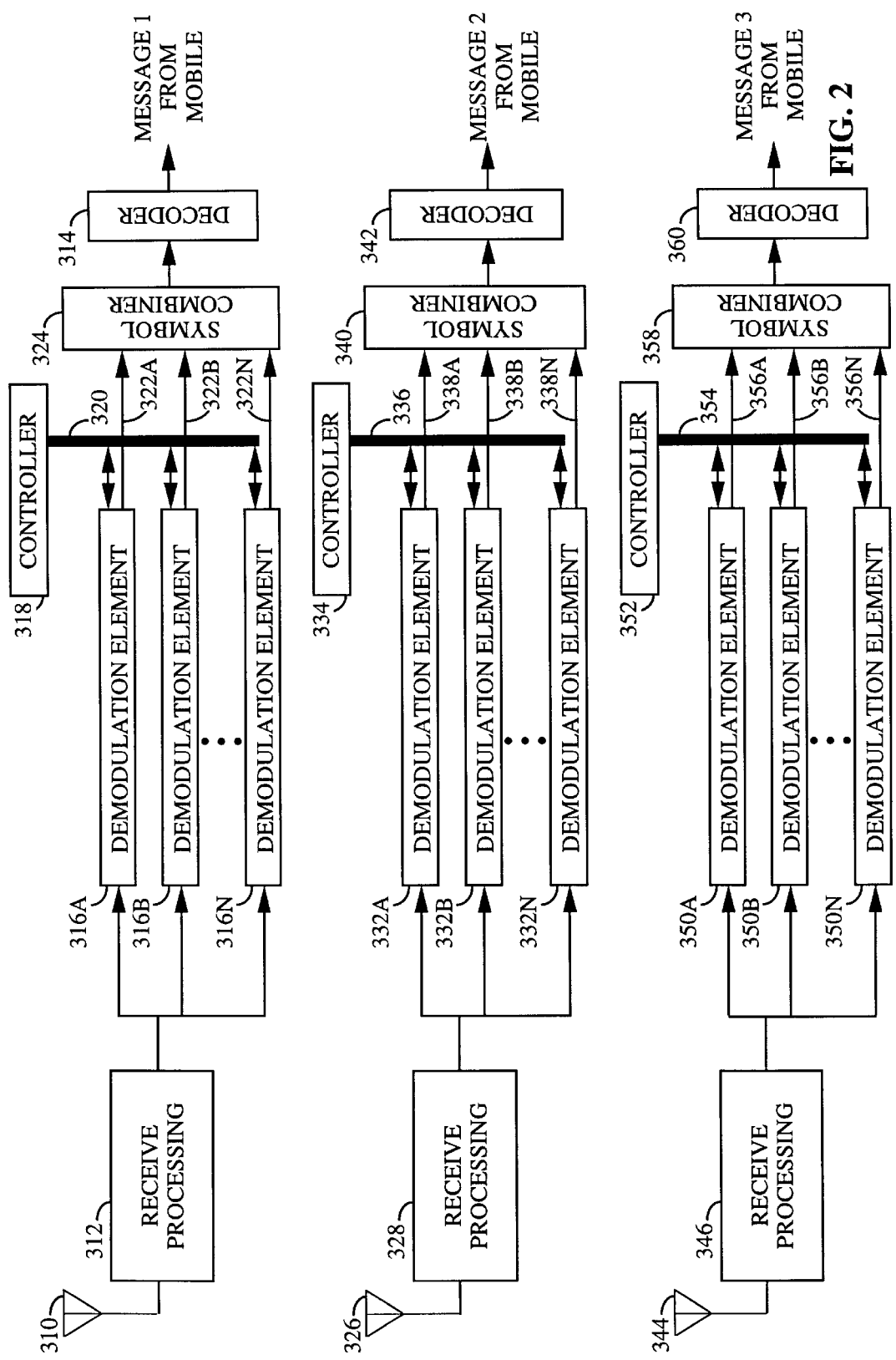
FIG. 2 is a block diagram illustrating an exemplary sectorized base station comprising multiple independent sectors.

FIG. 2 illustrates an exemplary embodiment of a three sectored base station that does not employ the present invention. In FIG. 2, each of antennas 310, 326, and 344 is the receive antenna for one sector of a common base station. FIG. 2 represents a typical sectorized base station in that antennas 310, 326, and 344 have overlapping coverage areas such that a single mobile unit signal may be present at more than one antenna at a time.

Antennas 310, 326, and 344 supply a receive signal to receive processings 312, 328, and 346 respectively. Receive processings 312, 328, and 346 process the RF signal and convert the signal to digital bits. Receive processings 312, 328, and 346 may also filter the digital bits. Receive processing 312 provides the filtered digital bits to demodulation elements 316A–316N. Receive processing 328 provides the filtered digital bits to demodulation elements 332A–332N. Likewise, receive processing 346 provides the filtered digital bits to demodulation elements 350A–350N.

Demodulation elements 316A–316N are controlled by controller 318 through interconnection 320. Controller 318 assigns demodulation elements 316A–316N to one of the plurality of information signals from a single mobile unit. Demodulation elements 316A–316N produce data bits 322A–322N that are combined in symbol combiner 324. The output of symbol combiner 324 may be aggregate soft decision data suitable for Viterbi decoding. The combined data is decoded by decoder 314 and output Message 1 from the mobile unit is passed to the cellular or personal communications system controller.

A power adjustment command for the mobile unit is created by the controller from the estimated signal strengths of each signal demodulated by demodulation elements 316A–316N. The controller can pass the power control information to the transmit circuitry of this sector of the base station (not shown) to be relayed to the mobile unit.

Demodulation elements 332A–332N are controlled by controller 334 through interconnection 336. Controller 334 assigns demodulation elements 332A–332N to one of the plurality of information signals from a single mobile unit. Demodulation elements 332A–332N produce data bits 338A–338N that are combined in symbol combiner 340. The output of symbol combiner 340 may be aggregate soft decision data suitable for Viterbi decoding. The combined data is decoded by decoder 342 and output Message 2 from the mobile unit is passed to the cellular or personal communications system controller.

A power adjustment command for the mobile unit is created by the controller from the estimated signal strengths of each signal demodulated by demodulation elements 332A–332N. The controller can pass the power control information to the transmit circuitry of this sector of the base station (not shown) to be relayed to the mobile unit.

Demodulation elements 350A–350N are controlled by controller 352 through interconnection 354. Controller 352 assigns demodulation elements 350A–350N to one of the plurality of information signals from a single mobile unit from the corresponding sector. Demodulation elements 350A–350N produce data bits 356A–356N that are combined in symbol combiner 352. The output of symbol combiner may be aggregate soft decision data suitable for Viterbi decoding. The combined data is decoded by decoder 360 and the output Message 3 from the mobile unit is passed to the cellular or personal communications system controller.

A power adjustment command for the mobile unit is created by the controller from the estimated signal strengths of each signal demodulated by demodulation elements 350A–350N. The controller can pass this information to the transmit circuitry of this sector of the base station (not shown) to be relayed to the mobile unit.

The present invention provides a much improved version of handoff between sectors of a common base station. In the present invention, signals from sectors of a common base station are combined within the base station in the same manner as multipath signals from an unsectorized base station. Signals from sectors of a common base station are combined before decoding occurs thus providing an improved system performance.

In the present invention, the process of soft handoff and the process of softer handoff are the same from the mobile unit's perspective. However the base station operation in softer handoff is different from soft handoff. The handoff process as described in U.S. patent application Ser. No. 07/847,148 referred to above, is summarized in the following steps as applied to handoff between two sectors of a common base station.

Normal Operation of Softer Handoff

1: Mobile unit is communicating with base station X through sector alpha antenna meaning base station X, sector alpha is identified as a member of the Active Set.
2: Mobile unit monitors that the pilot signal from base station X, sector beta antenna that is identified as a member of the Neighbor Set. The pilot signal strength from base station X, sector beta antenna exceeds a predetermined threshold.
3: Mobile unit identifies base station X, sector beta as a member of the Candidate Set and informs base station X through sector alpha antenna.
4: Base station X establishes the availability of resources in sector beta.
5: Sector beta antenna begins to receive a reverse link signal from mobile unit.

6: Sector beta antenna begins to transmit a forward link signal to mobile unit.
7: Base station X through sector alpha antenna updates the mobile unit Active Set to identify sector beta as a member.
8: Mobile unit establishes communication with base station X, sector beta antenna. Mobile unit combines the signals from sector alpha antenna and sector beta antenna based on the signal strength of the pilot signal from the corresponding sector antenna.
9: Base station X combines the signals from mobile unit received through sector alpha antenna and sector beta antenna (softer handoff).

Figure 3:
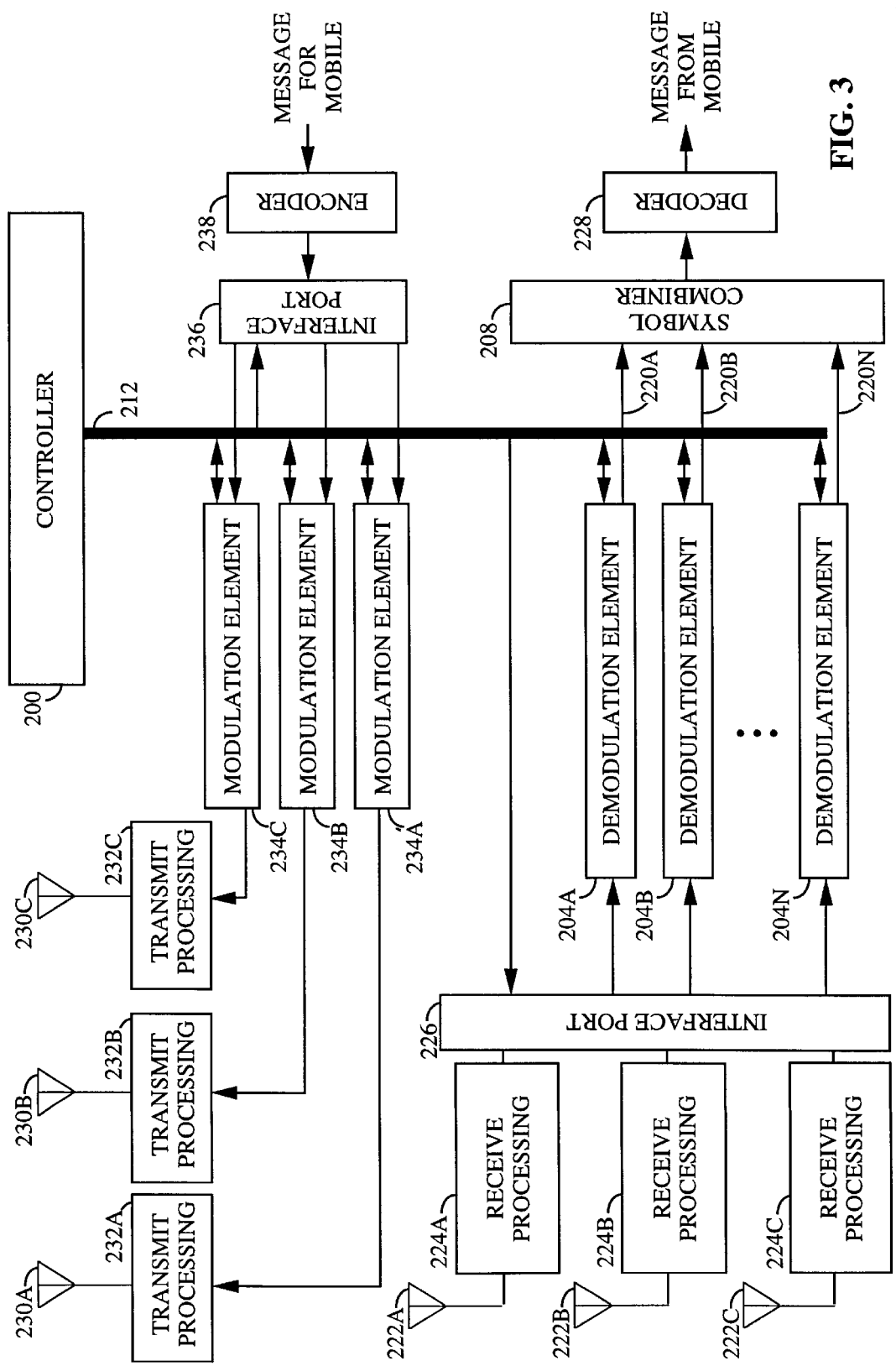
FIG. 3 is a block diagram illustrating an exemplary sectorized base station according to the present invention.

FIG. 3 illustrates an exemplary embodiment of a three sectored base station. FIG. 3 is a representation of a preferred embodiment of the present invention in a three sectored base station however the ideas of the present invention are equally applicable to base stations with fewer or more sectors. Although only one receive antenna is show for each sector, typically two antennas are used for diversity with the receive signal combined for processing.

In FIG. 3, each of antennas 222A–222C is the receive antenna for one sector and each of antennas 230A–230C is the transmit antenna for one sector. Antenna 222A and antenna 230A correspond to a common coverage area and can ideally have the same antenna pattern. Likewise antennas 222B and 230B, and antennas 222C and 230C correspond to common coverage areas respectfully. FIG. 3 represents a typical base station in that antennas 222A–222C have overlapping coverage areas such that a single mobile unit signal may be present at more than one antenna at a time.

Figure 4:
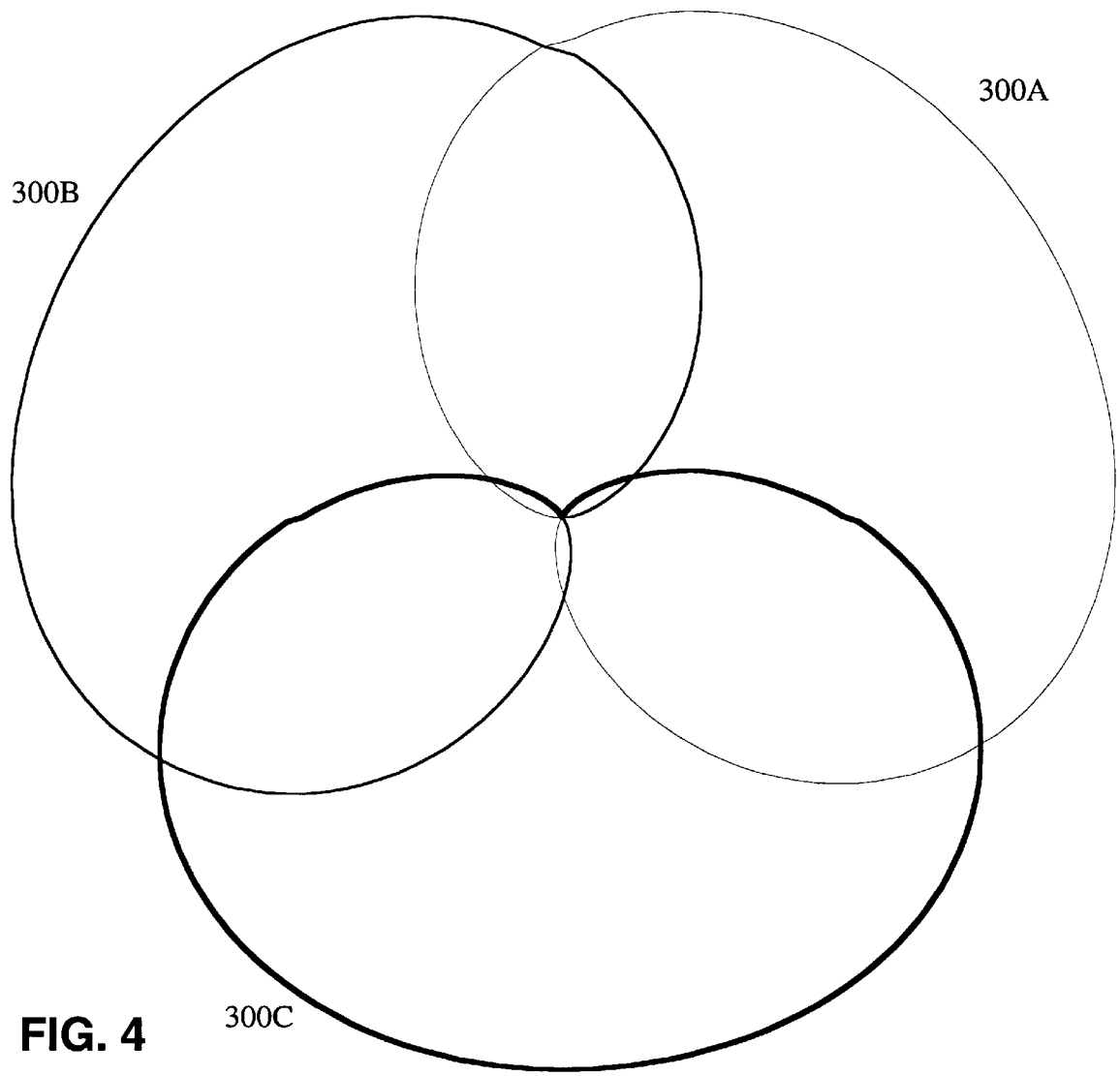
FIG. 4 is an exemplary representation of the coverage area of three sectors of a sectorized base station.

FIG. 4 is a more realistic representation of the coverage areas of three sectors of a sectorized base station than base station 60 of FIG. 1. Coverage area 300A, as represented by the finest line, corresponds to the coverage area of both antennas 222A and 230A. Coverage area 300B, as represented by the medium width line, corresponds to the coverage area of both antennas 222B and 230B. Coverage area 300C, as represented by the heaviest line, corresponds to the coverage area of both antennas 222C and 230C. The shape of the three coverage areas is the shape produced by standard directional dipole antenna. The edges of the coverage areas can be thought of as the location at which a mobile unit receives the minimum signal level to support communication through that sector. As a mobile unit moves into the sector, the signal strength increases. As a mobile unit moves past the edge of the sector, communication through that sector may degrade. A mobile unit operating in softer handoff mode is likely to located in the overlapped region of two coverage areas.

Referring again to FIG. 3, antennas 222A, 222B, and 222C supply the received signal to receive processings 224A, 224B, and 224C respectively. Receive processings 224A, 224B, and 224C process the RF signal and convert the signal to digital bits. Receive processings 224A, 224B, and 224C may filter the digital bits and provide the resulting digital bits to interface port 226. Interface port 226 may connect any of the three incoming signal paths to any of the demodulation elements 204A–204N under the control of controller 200 through interconnection 212.

The preferred embodiment of FIG. 3 gives an implementation where receive processings 224A, 224B, and 224C produce digital bits and interface port 226 is a digital device. This portion of the architecture could be implemented in a variety of methods. In one alternative method, receive processing 224A, 224B, and 224C pass analog signals to demodulation elements 204A–204N and interface port 226 incorporates the appropriate analog circuitry.

Continuing in with the preferred embodiment, demodulation elements 204A–204N are controlled by controller 200 through interconnection 212. Controller 200 assigns demodulation elements 204A–204N to one of the plurality of information signals from a single mobile unit from any one of the sectors. Demodulation elements 204A–204N produce data bits 220A–220N each representing an estimate of the data from the single mobile unit. Data bits 220A–220N are combined in symbol combiner 208 to produce a single estimate of the data from the mobile unit. The output of symbol combiner 208 may be aggregate soft decision data suitable for Viterbi decoding. The combined symbols are passed to decoder 228.

Demodulation elements 204A–204N also provide several output control signals to controller 200 through interconnection 212. The information passed to controller 200 includes an estimate of the signal strength of the signal assigned to a particular demodulator. Each one of demodulation elements 204A–204N measures a signal strength estimation of the signal that it is demodulating and provides the estimation to controller 200.

In many applications, an actual base station also comprises at least one searcher element. The searcher element is also capable of demodulating a signal and is used to continually scan the time domain in search of available signals. The searcher element identifies a set of available signals and passes the information to the controller. The controller may use the set of available signals to assign or re-assign the demodulation elements to the most advantageous signals available. The placement of the searcher element is the same as the placement of the demodulating elements in FIG. 2. As such the searcher elements may also be assigned to a signal from a plurality of sectors of a common base station. In the most general case, demodulation elements 204A–204N can be assumed to comprise some elements that are capable of performing the searching function.

Notice that symbol combiner 208 can combine signals from just one sector to produce an output or it can combine symbols from multiple sectors as selected by the interface port 226. A single power control command is created by the controller from the estimated signal strengths independent of the sector through which the signal is received. The controller can pass this information to the transmit circuitry of each sector of the base station. Thus each sector in the base station transmits the same power control information to a single mobile unit.

When symbol combiner 208 is combining signals from a mobile unit that is communicating through more than one sector, the mobile unit is in softer handoff. The base station may send the output of decoder 228 to a cellular or personal communication system controller. At the cellular or personal communication system controller, signals from this base station and from other base stations are used to produce a single output (soft handoff.)

The transmit process shown in FIG. 3 receives a message for a mobile unit from the end user through the cellular or personal communication system controller. The message can be sent on one or more of antennas 230A–230C. Interface port 236 connects the message for the mobile unit to one of more of modulation elements 234A–234C as set by controller 200. Modulation elements modulate the message for the mobile unit with the appropriate PN code. The modulated data from modulation elements 234A–234C is passed to transmit processing 232A–232C respectively. Transmits processings 232A–232C convert the message to an RF frequency and transmit the signal at an appropriate signal level through antennas 230A–230C respectively. Notice that interface port 236 and interface port 226 operate independently in that receiving a signal from a particular mobile unit through one of antennas 222A–222C does not necessarily mean that the corresponding transmit antenna 230A–230C is transmitting a signal to the particular mobile unit. Also note that the power control commands sent through each antenna is the same, thus sector diversity from a common base station is not critical for the optimal power control performance.

Another feature of the present invention is the increased flexibility of the base station resources. Comparing FIG. 2 to FIG. 3, the flexibility is apparent. In the three sectors represented in FIG. 2, suppose that the sector corresponding to antenna 310 is heavily loaded with signals such that the number of incoming signals is greater than the number of demodulation elements. The fact that the sector corresponding to antenna 326 is lightly loaded and has unused demodulation elements does not aid the sector corresponding to antenna 310. In FIG. 3, however, each demodulation element may be assigned to a plurality of sectors thus allowing allocation of resources to the most heavily loaded sector.

There are many obvious variations to the present invention as presented including simple architectural changes. The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A base station having a base station transceiver system for receiving at least two reverse link radio frequency signals transmitted across a single frequency band by a mobile unit located within a cell associated with said base station, the mobile unit simultaneously transmitting the reverse link radio frequency signals to at least first and second sectors within the base station during a handoff between said first and second sectors, said base station transceiver system comprising:

first and second receive processing systems, said first and second receive processing systems each simultaneously receiving one of said at least two reverse link signals from said mobile unit, said first receive processing system being assigned to said first sector of said base station, said second receive processing system being assigned to said second sector of said base station;

an interface port that selectively couples each of said first and second receive processing systems to one of first and second demodulation elements during said handoff, each of said demodulation elements being capable of simultaneously demodulating a processed signal received from either of said first and second receive processing systems during said handoff; and a combiner for combining each demodulated signal from said first and second demodulation elements to create a summed demodulated signal during said handoff.

2. The base station transceiver system of claim 1 further comprising:

a decoder for decoding said summed demodulated signal.

3. A base station having a base station transceiver system for receiving at least two reverse link radio frequency signals transmitted across a single frequency band by a mobile unit located within a cell associated with said base station, the mobile unit simultaneously transmitting the reverse link radio frequency signals to at least first and second sectors within the base station between said first and second sectors, said base station transceiver system comprising:

first and second receive processing systems, said first and second receive processing systems each simultaneously receiving one of said at least two reverse link signals from said mobile unit, said first receive processing system being assigned to said first sector of said base station, said second receive processing system being assigned to said second sector of said base station;

an interface port that selectively couples each of said first and second receive processing systems to one of first and second demodulation elements, each of said demodulation elements being capable of simultaneously demodulating a processed signal received from either of said first and second receive processing systems; and a combiner for combining each demodulated signal from said first and second demodulation elements to create a summed demodulated signal.

* * * * *